UNITED STATES PATENT OFFICE 2,689,864

DICARBOXYLIC SULFONES

William S. Emerson and Robert A. Heimsch, Dayton, Ohio, assignors to Monsanto Chemical Company, St. Louis, Mo., a corporation of Delaware No Drawing. Application April 20, 1950,
Serial No. 157,182

8 Claims. (Cl. 260—470)

This invention relates to new aralkyl dicarboxylic sulfones and esters of the same.

The new sulfones are carboxymethyl carboxybenzyl sulfones and their alkyl esters having the general structure:

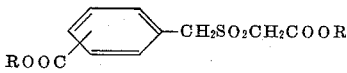

in which R is a member of the group consisting of hydrogen and alkyl groups of from 1 to 8 carbon atoms. As illustrative of compounds having the above general structure may be mentioned 2-, 3- or 4-carboxybenzyl carboxymethyl sulfone, 4-carbomethoxybenzyl carbomethoxymethyl sulfone, 3 - carboisopropoxybenzyl carboethoxymethyl sulfone, 2 - carbobutoxybenzyl carbobutoxymethyl sulfone, 4 - carbo(2 - ethylhexyl) - oxybenzyl carboxymethyl sulfone, and 3-carbooctyloxybenzyl octyloxymethyl sulfone.

The present new dicarboxy sulfones or their dialkyl esters are readily obtainable by oxidation of carboxybenzyl carboxymethyl sulfides or mono- or di-alkyl esters of the same. Oxidation of the sulfides to the corresponding sulfones may be effected by contacting with a mild oxidizing agent, e. g., an organic or inorganic oxygen-liberating agent such as hydrogen peroxide, barium peroxide, benzoyl peroxide, potassium persulfate, etc. For ease in manipulation, hydrogen peroxide is preferred. The oxidation is preferably effected in an unreactive solvent medium such as glacial acetic acid, acetone, methyl ethyl ketone, etc. Depending upon the nature of the reactants, as well as upon the rate at which the oxidizing agent is added to the sulfide, various temperatures may be employed for the oxidation. Cooling is often necessary with the more active peroxides; in other cases ordinary or even increased temperatures may be employed.

Dialkyl esters of the carboxybenzyl carboxymethyl sulfones are also obtainable by esterifying the free acids with an unsubstituted, aliphatic saturated alcohol of from 1 to 8 carbon atoms, preferably in the presence of an esterifying catalyst. The higher alkyl esters, i. e., carboalkoxybenzyl carboalkoxymethyl sulfones, in which the alkoxy group has from 4 to 8 carbon atoms, are more advantageously prepared; however, by an interchange reaction whereby a lower dialkyl ester of a carboxybenzyl carboxymethyl sulfone, for example, the dimethyl ester is reacted with an unsubstituted, aliphatic saturated alcohol of from 4 to 8 carbon atoms in the presence of an esterifying catalyst.

Catalysts of general utility in both types of esterifications are acidic materials, for example, p-toluenesulfonic acid, sulfuric acid, pyrophosphoric acid, hydrochloric acid, etc. In both esterifying procedures, formation of the desired esters occurs to some extent at ordinary room temperature; however, in order to obtain good yields we prefer to operate at refluxing temperatures while removing from the reaction zone either the water which is given off during the direct esterification or the lower alcohol generated in the interchange reaction.

The carboxybenzyl carboxymethyl sulfones and their lower alkyl esters are stable, crystalline solids or viscous, high-boiling liquids, which may be advantageously employed in the chemical and allied industries for a wide variety of purposes. The free acids, i. e., the 2-, 3- and 4-carboxybenzyl carboxymethyl sulfones may serve as intermediates in the production of synthetic fibers of the dicarboxylamide type, and in the production of non-ionic wetting-out and detersive agents.

Dialkyl esters of the carboxybenzyl carboxymethyl sulfones in which the alkyl groups have from 4 to 8 carbon atoms are highly efficient plasticizers for vinyl chloride polymers. A wide variety of plasticizers has been employed for the purpose of improving the physical properties of vinyl chloride polymers. Particular attention has been given to the improvement of flexibility and heat and light stability of such plasticized compositions. In many instances the improvement in flexibility has been obtainable only by sacrificing other desirable properties of an ideal polyvinyl chloride composition, such as low volatility, color and heat stability, water absorption, etc. We have found that very good flexibility, without sacrifice of temperature stability and low volatility, is imparted to vinyl chloride polymers where the present esters are employed as plasticizers for such polymers.

The present esters are valuable plasticizers for polyvinyl chloride and copolymers of at least 70 per cent by weight of vinyl chloride and up to 30 per cent by weight of an unsaturated monomer copolymerized therewith, for example, vinyl acetate, vinylidene chloride, etc.

We have found these esters serve not only to soften vinyl chloride polymers, but also to impart simultaneously a high degree of low temperature flexibility, very good temperature stability and great mechanical strength to these polymers. The present esters are compatible with vinyl chloride polymers and show no exudation of plasticizer even at plasticizer contents of up to 50 per cent. Although the quantity of plasticizer will depend upon the particular polymer to be plasticized and upon its molecular weight, it is generally found that compositions having from 5 per cent to 50 per cent by weight of plasticizer will, in most cases, be satisfactory for general utility. The good flexibility of the plasticized compositions increases with increasing plasticizer concentration.

In evaluating plasticizer efficiency use is made of the following empirical testing procedures:

*Compatibility.*—Visual inspection of the plasticized composition is employed, incompatibility of the plasticizer with the polymer being demonstrated by cloudiness and exudation of the plasticizer.

*Hardness.*—A standard instrument made by the Shore Instrument Company is used for this determination and expresses the hardness in units from 1 to 100. The hardness of a composition is judged by its resistance to the penetration of a standard needle applied to the composition under a standard load for a standard length of time.

*Low temperature flexibility.*—Low temperature flexibility is one of the most important properties of elastomeric vinyl compositions. While many plasticizers will produce flexible compositions at room temperature the flexibility of these compositions at low temperatures may vary considerably, i. e., plasticized polyvinyl chloride compositions that are flexible at room temperature often become very brittle and useless at low temperatures. Low temperature flexibility tests herein employed are according to the Clash-Berg method. This method determines the torsional flexibility of a plastic at various temperatures. The temperature at which the vinyl chloride composition exhibits an arbitrarily established minimum flexibility is defined as the low temperature flexibility of the composition. This value may also be defined as the lower temperature limit of the plasticized composition's usefulness as an elastomer.

*Volatility.*—Just as a decrease in low temperature often results in decreased flexibility of a plasticized polymer composition so does a decrease in plasticizer concentration when caused by volatilization of the plasticized. Hence, plasticizers which are readily volatilized from the plasticized composition as a result of aging or heating are inefficient because upon volatilization the plasticized compositions become stiff and hard. The test for plasticizer volatility herein employed is that described by the American Society for Testing Materials under the designation D-744-44T.

*Water resistance.*—The amount of water absorption and the amount of leaching that takes place when the plasticized composition is immersed in distilled water for 24 hours is determined.

The invention is further illustrated but not limited by the following examples:

*Example 1*

To 145 g. of 4-carbomethoxybenzyl carbomethoxymethyl sulfide (obtained by reacting 4-(chloromethyl)benzoyl chloride with thioglycolic acid and esterifying the resulting 4-carboxybenzyl carboxymethyl sulfide with methanol) and 500 cc. of glacial acetic acid there was added 20 cc. of 30% hydrogen peroxide during a time of 10 minutes, the temperature rising from 25° C. to 54° C. during the addition. An additional 180 cc. of hydrogen peroxide was then added over a 40 minute period. The maximum temperature of the reaction mixture during the addition was observed to be 80° C. Within 10 minutes the temperature of the reaction mixture rose to 105° C. Within another 10 minutes it had dropped to 90° and was held at this temperature for another 45 minutes. Addition of 1000 cc. of water to the mixture and subsequent cooling resulted in some crystallization. Filtration of the crystals formed and repeated crystallization of the filtrate gave 5 crops of crystals which upon recrystallization from methanol gave 163 g. (81.7% theoretical yield) of 4-carbomethoxybenzyl carbomethoxymethyl sulfone, M. P. 104.5–105° C., and analyzing as follows:

|  | Calcd. for $C_{12}H_{14}O_6S$ | Found |
| --- | --- | --- |
| Percent C | 50.35 | 50.44 |
| Percent H | 4.89 | 4.68 |

4-carbomethoxybenzyl carbomethoxymethyl sulfone may be readily hydrolyzed to the free acid, 4-carboxybenzyl carboxymethyl sulfone.

*Example 2*

This example shows the preparation of 4-carbo(2-ethylhexyl)oxybenzyl carbo(2-ethylhexyl)-oxymethyl sulfone from the methyl ester of the preceding example.

A mixture consisting of 37 g. (0.13 mole) of 4-carbomethoxybenzyl carbomethoxymethyl sulfone, 65 g. (0.5 mole) of 2-ethylhexanol and 1.0 g. of p-toluenesulfonic acid was placed in a flask fitted with a 24" Vigreaux column and refluxed for 10 hours under slightly reduced pressure with the pot temperature being from 145 to 155° C. During the refluxing, methanol was removed as it was formed. The reaction mixture was then washed with a 5% aqueous solution of sodium bicarbonate and ether was added to break the resulting emulsion. The whole was then washed with water until neutral, 10 g. of charcoal (Norite) was added, and the ether and unreacted 2-ethylhexanol (23 g.) were distilled off. The residue was then heated to a temperature of 165° C./0.25 mm. in order to drive off low-boiling materials and held at a temperature of from 150 to 155° C./0.25 mm. for 1.5 hours. Filtration of the product to remove the charcoal gave 56 g. (89.8 per cent yield) of 4-carbo(2-ethylhexyl)oxybenzyl carbo(2-ethylhexyl)oxymethyl sulfone, molecular refraction 132.47 (calcd. 134.40), and analyzing as follows:

|  | Calcd. for $C_{26}H_{42}O_6S$ | Found |
| --- | --- | --- |
| Percent C | 64.74 | 64.73, 64.86 |
| Percent H | 8.71 | 8.74, 8.44 |

The reaction of other alcohols of from 4 to 8 carbon atoms, instead of 2-ethylhexanol, with 4-carbomethoxybenzyl carbomethoxymethyl sulfone may be effected similarly, as with n-hexanol and the dimethyl ester to yield 4-carbo-n-hexoxybenzyl carbo-n-hexoxymethyl, or with isobutanol and 4-carbomethoxybenzyl carbomethoxymethyl sulfone to yield 4-carbo-isobutoxybenzyl carbo-isobutoxymethyl sulfone, etc. When working with the higher alcohols, the diethyl ester, instead of the dimethyl ester, may be used for the interchange reaction. Also, instead of using the 4-isomers, the 2- or 3-isomer may be employed, i. e., the methyl or ethyl esters of 2- or 3-carboxybenzyl carboxymethyl sulfone may be employed to yield the higher dialkyl ester of 2- or 3-carboxybenzyl carboxymethyl sulfone.

*Example 3*

Sixty parts of polyvinyl chloride and 40 parts by weight of 4-carbo(2-ethylhexyl)oxybenzyl carbo(2-ethylhexyl)oxymethyl sulfone are mixed on a rolling mill to a homogeneous blend. During the milling there was observed substantially no fuming and discoloration. A molded sheet of the mixture was clear and transparent and substantially colorless. Testing of the molded sheet for low temperature flexibility, according to the testing procedure described above, gave a value of minus 13° C. Tests on the volatility characteristics of the plasticized composition gave a value of 0.9 per cent, which showed very good retention of plasticizer and indicated good temperature characteristics of the composition. The plasticized material had a hardness of 82 before the volatility test and a hardness of 79 after the volatility test. When subjected to heat at a temperature of 325° F. for a period of 30 minutes the clarity and color of the molded product were substantially unchanged. Tests of the water-resistance properties of the plasticized material employing the test procedure described above showed a solids-loss of only 0.03 per cent and an 0.36 per cent water absorption value.

Instead of the esters employed in the examples above, other esters of carboxybenzyl carboxymethyl sulfones may be used to give similarly valuable plasticized polyvinyl chloride compositions. Thus, by employing 40 parts by weight of di-n-octyl, di-isoamyl, di-n-hexyl or dibutyl ester of 2-, 3- or 4-carboxybenzyl carboxymethyl sulfone with 60 parts by weight of polyvinyl chloride or with 60 parts by weight of a vinyl chloride-vinyl acetate copolymer known to the trade as "Vinylite," or "VYNW," there may be obtained clear, colorless compositions of very good flexibility and stability.

While the above examples show only a composition in which the ratio of plasticizer to polymer content is 40:60, this ratio being employed in order to get comparable efficiencies, the content of ester to polyvinyl chloride may be widely varied, depending upon the properties desired in the final product. For many purposes a plasticizer content of, say, from only 10 per cent to 20 per cent is preferred. The present esters are compatible with polyvinyl chloride over a wide range of concentrations.

Although the invention has been described particularly with reference to the use of the present carboalkoxybenzyl carboalkoxymethyl sulfones as plasticizers for polyvinyl chloride, these esters may be advantageously employed also as plasticizers for copolymers of vinyl chloride, for example, the copolymers of vinyl chloride with vinyl acetate, vinylidene chloride, methyl methacrylate, acrylonitrile, butadiene, or styrene. Preferably, such copolymers have a high vinyl chloride content, i. e., a vinyl chloride content of at least 70 per cent by weight of vinyl chloride and up to 30 per cent by weight of the copolymerizable monomer.

The plasticized polyvinyl halide compositions of the present invention have good thermal stability; however, for many purposes it may be advantageous to use known stabilizers in the plasticized compositions. Inasmuch as the present esters are substantially unreactive with the commercially available heat and light stabilizers which are commonly employed with polyvinyl chloride or copolymers thereof, the presence of such additions in the plasticized materials does not impair the valuable properties of the present esters. The present esters are of general utility in softening vinyl chloride polymers. They may be used as the only plasticizing component in a compounded vinyl chloride polymer or they may be used in conjunction with other plasticizers.

What we claim is:

1. Sulfones having the general structure:

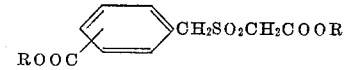

in which R is an alkyl radical.

2. Carbomethoxybenzyl carbomethoxymethyl sulfones.

3. Carbo(2-ethylhexyl)oxybenzyl carbo(2-ethylhexyl)-oxymethyl sulfones.

4. 4-carbomethoxybenzyl carbomethoxymethyl sulfone.

5. 4 - carbo(2 - ethylhexyl)oxybenzyl carbo(2-ethylhexyl)-oxymethyl sulfone.

6. The process which includes treating, in an unreactive solvent medium, a thioether having the general structure:

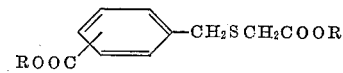

in which R is an alkyl radical of from 1 to 8 carbon atoms, with an oxidizing agent selected from the class consisting of organic and inorganic per-oxygen compounds and recovering from the reaction product sulfones having the general formula:

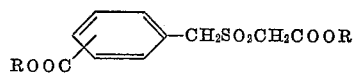

in which R is an alkyl radical of from 1 to 8 carbon atoms.

7. The process which includes treating, in an unreactive solvent medium, a carbomethoxybenzyl carbomethoxymethyl sulfide with an oxidizing agent selected from the class consisting of organic and inorganic per-oxygen compounds and recovering a carbomethoxybenzyl carbomethoxymethyl sulfone from the reaction product.

8. The process which comprises treating 4-carbomethoxybenzyl carbomethoxymethyl sulfide with hydrogen peroxide in an inert solvent and recovering 4-carbomethoxybenzyl carbomethoxymethyl sulfone from the resulting reaction product.

References Cited in the file of this patent

UNITED STATES PATENTS

| Number | Name | Date |
| --- | --- | --- |
| 2,264,927 | Albrecht | Dec. 2, 1941 |
| 2,355,592 | Kosmin | Aug. 8, 1944 |
| 2,356,586 | Hentrich et al. | Aug. 22, 1944 |
| 2,434,150 | Dickey et al. | Jan. 6, 1948 |
| 2,473,708 | Hayes | June 21, 1949 |

OTHER REFERENCES

Lesser et al., Ber. Deut. Chem., 56B, 1642-8 (1923).